United States Patent
Obuchi et al.

(10) Patent No.: US 10,138,738 B2
(45) Date of Patent: Nov. 27, 2018

(54) COMPOSITE VANE

(71) Applicant: IHI Corporation, Koto-ku (JP)

(72) Inventors: Kenro Obuchi, Koto-ku (JP); Hiroyuki Yagi, Koto-ku (JP)

(73) Assignee: IHI Corporation, Koto-ku (JP)

( * ) Notice: Subject to any disclaimer, the term of this patent is extended or adjusted under 35 U.S.C. 154(b) by 290 days.

(21) Appl. No.: 15/046,036

(22) Filed: Feb. 17, 2016

(65) Prior Publication Data

US 2016/0160659 A1   Jun. 9, 2016

Related U.S. Application Data

(63) Continuation of application No. PCT/JP2014/065908, filed on Jun. 16, 2014.

(30) Foreign Application Priority Data

Aug. 19, 2013  (JP) ................................. 2013-169570

(51) Int. Cl.
  *F04D 29/38* (2006.01)
  *F01D 5/28* (2006.01)
  (Continued)

(52) U.S. Cl.
  CPC .............. *F01D 5/282* (2013.01); *F01D 5/147* (2013.01); *F01D 5/288* (2013.01); *F04D 29/023* (2013.01);
  (Continued)

(58) Field of Classification Search
  CPC .... F04D 29/388; F04D 29/384; F04D 29/324; F01D 5/288; F01D 5/286; F01D 5/282; B64C 11/205
  (Continued)

(56) References Cited

U.S. PATENT DOCUMENTS 3,775,208 A    11/1973  Grigoleit et al.
5,174,024 A *  12/1992  Sterrett .................. B64C 27/46
                                                        29/889.71
(Continued)

FOREIGN PATENT DOCUMENTS

CN    201288687 Y    8/2009
FR    2.105.163 A1    4/1972
(Continued)

OTHER PUBLICATIONS

JP 08049559—Translation and original from Espacenet.*
(Continued)

*Primary Examiner* — Dwayne J White
*Assistant Examiner* — Behnoush Haghighian
(74) *Attorney, Agent, or Firm* — Oblon, McClelland, Maier & Neustadt, L.L.P.

(57) ABSTRACT

A composite vane body formed of a composite material of a thermosetting resin or a thermoplastic resin, and reinforced fibers, and a metal sheath that is bonded to a leading edge section of the composite vane body via a soft adhesive to cover the leading edge section are included, and an adhesive filling section in which the soft adhesive is filled, a plurality of leading edge side contact sections that come into contact with a curved section corresponding to a leading edge of the metal sheath, and a plurality of protrusions that come into contact with a planar section corresponding to a vane surface of the metal sheath, with at least a same height as a thickness of a layer of a requisite amount of the soft adhesive filled in the adhesive filling section are formed in the leading edge section of the composite vane body. Attachment of the metal sheath to the leading edge section can be performed easily with high precision.

8 Claims, 5 Drawing Sheets

(51) Int. Cl.
*F04D 29/02* (2006.01)
*F04D 29/54* (2006.01)
*F01D 5/14* (2006.01)
*F04D 29/32* (2006.01)
*B64C 11/20* (2006.01)

(52) U.S. Cl.
CPC .......... *F04D 29/542* (2013.01); *B64C 11/205* (2013.01); *F01D 5/286* (2013.01); *F04D 29/324* (2013.01); *F04D 29/384* (2013.01); *F04D 29/388* (2013.01); *F05D 2220/36* (2013.01); *F05D 2230/23* (2013.01); *F05D 2240/121* (2013.01); *F05D 2240/303* (2013.01); *F05D 2300/10* (2013.01); *F05D 2300/603* (2013.01)

(58) Field of Classification Search
USPC .......................................................... 416/224
See application file for complete search history.

(56) References Cited

U.S. PATENT DOCUMENTS

| | | | | |
|---|---|---|---|---|
| 9,664,201 | B2 * | 5/2017 | Dudon | ................... B23P 15/04 |
| 2006/0275626 | A1 | 12/2006 | Bernard et al. | |
| 2010/0028160 | A1 | 2/2010 | Schaeffer et al. | |
| 2011/0020130 | A1 * | 1/2011 | Murakami | .............. B29C 70/30 |
| | | | | 416/223 R |
| 2012/0163981 | A1 * | 6/2012 | Hong | ...................... F01D 5/288 |
| | | | | 416/224 |
| 2014/0272310 | A1 * | 9/2014 | Lazur | ..................... B05D 3/002 |
| | | | | 428/164 |

FOREIGN PATENT DOCUMENTS

| | | | | |
|---|---|---|---|---|
| JP | 64-76799 | | 3/1989 | |
| JP | 64-76799 | A | 3/1989 | |
| JP | 8-49559 | | 2/1996 | |
| JP | 08049559 | A * | 2/1996 | .............. B23P 6/002 |
| JP | 2001-41002 | | 2/2001 | |
| JP | 2001-41002 | A | 2/2001 | |
| JP | 2001041002 | A * | 2/2001 | |
| JP | 2009-24695 | | 2/2009 | |
| JP | 2009-68493 | | 4/2009 | |
| JP | 2010-38156 | | 2/2010 | |
| JP | 4887069 | | 2/2012 | |
| SU | 1545010 | A1 | 2/1990 | |
| SU | 1213811 | A | 6/1991 | |

OTHER PUBLICATIONS

JP 2001041002—Translation and original from Espacenet.*
Extended European Search Report dated Apr. 6, 2017 in Patent Application No. 14837785.6.
International Search Report dated Sep. 16, 2014 in PCT/JP2014/065908, filed Jun. 16, 2014 (with English Translation).

* cited by examiner

COMPOSITE VANE

TECHNICAL FIELD

Embodiments described herein relate to a composite vane that is used as a stator vane that composes a turbofan engine, for example.

BACKGROUND ART

A turbofan engine as described above is conventionally equipped with rotor blades that introduce air into an engine body, and guide vanes that are stator vanes straightening a flow of the air which is introduced by the rotor blades.

In order to meet requirements for increasing bypass ratio with an objective of improving fuel efficiency of a turbofan engine of recent years, fan diameter is tend to be enlarged. Accordingly, it becomes urgent to reduce the weight of the turbofan engine.

The weight of the guide vane which is a stator vane straightening the flow of air, is reduced by making it a composite vane consisting of a composite material of a thermosetting resin such as epoxy resin and reinforced fibers such as carbon fibers, for example. In the case of the guide vane consisting of a composite material like this, the wear resistance is lower as compared with a metallic guide vane. Therefore, abrasion is avoided by bonding a metal sheath for preventing erosion to a leading edge section (a leading edge and a vicinity of the leading edge) which is especially easily worn, by an adhesive (refer to Patent Documents 1 and 2, for example).

Such metallic sheath for preventing erosion sometimes suffers so-called FOD (Foreign Object Damage), in which the metal sheath is damaged by collisions with foreign objects such as small stones which are sucked into the engine. In order to suppress damages to the metal sheath at the time of collision with foreign objects, and to make the adhesive be easily peeled off at a time of replacement of the metal sheath which suffers the FOD, the metal sheath is bonded using a soft adhesive as the adhesive (refer to Patent Document 3, for example).

When the metal sheath is bonded to the leading edge section using the soft adhesive as described above, it is required to keep the thickness of the layer of the soft adhesive uniform at the time of applying the soft adhesive. As the art of making the thickness of the soft adhesive uniform, there is known a method, in which studs with the same height as the thickness of the soft adhesive are formed on the surface, on which the soft adhesive is applied (refer to Patent Document 4, for example).

RELATED ART DOCUMENTS

Patent Documents

Patent Document 1: Japanese Patent Laid-Open No. 2009-024695
Patent Document 2: Japanese Patent Laid-Open No. 2009-068493
Patent Document 3: Japanese Patent Laid-Open No. 2001-041002
Patent Document 4: Japanese Patent Laid-Open No. 01-076799

SUMMARY

Problems to be Solved

As described above, if the soft adhesive is used in bonding the metal sheath to the leading edge section, a damage which the metal sheath suffers when foreign objects such as small stones hit the metal sheath can be suppressed to be small, and facilitation of replacement work of the metal sheath can be realized.

However, when the metal sheath is bonded to the leading edge section using the soft adhesive, it is difficult to perform positioning of the metal sheath to the leading edge section while keeping the thickness of the layer of the soft adhesive uniform at the time of applying the soft adhesive. Therefore, there is a problem that much time and effort are taken to attach the metal sheath to the leading edge section with high precision, and to solve this problem is a challenge in the prior art.

The present disclosure has been made in view of the conventional problem described above, and has an object to provide a composite vane in which attachment of a metal sheath to a leading edge section can be performed easily with high precision.

Means for Solving the Problems

The present disclosure is a composite vane including a composite vane body formed of a composite material of a thermosetting resin or a thermoplastic resin, and reinforced fibers, and a metal sheath that is bonded to a leading edge section (a leading edge and a vicinity of the leading edge) of the composite vane body via a soft adhesive to cover the leading edge section, wherein an adhesive filling section in which the soft adhesive is filled, a leading edge side contact section that comes into contact with a curved section corresponding to a leading edge of the metal sheath, and a plurality of vane surface side contact sections that come into contact with a planar section corresponding to a vane surface of the metal sheath, with at least a same height as a thickness of a layer of a requisite amount of the soft adhesive filled in the adhesive filling section are formed in the leading edge section of the composite vane body.

In the composite vane according to the present disclosure, in a production process of the composite vane, in a case where the metal sheath is bonded to the leading edge section of the composite vane body via the soft adhesive, after a requisite amount of the soft adhesive is filled in the adhesive filling section of the leading edge section, and the soft adhesive is applied on a bond surface of the metal sheath, the metal sheath is fitted onto the leading edge section of the composite vane body and is pressed against the leading edge side contact section and the plurality of vane surface side contact sections.

At this time, the leading edge side contact section comes into contact with the curved section corresponding to the leading edge of the metal sheath, and the plurality of vane surface side contact sections come into contact with the planar section corresponding to the vane surface of the metal sheath with at least the same height as the thickness of the layer of the requisite amount of the soft adhesive which is filled in the adhesive filling section. That is, the metal sheath comes into contact with the layer of the soft adhesive uniformly in the state where positioning is performed, and therefore, attachment of the metal sheath to the leading edge section is performed easily with high precision.

Advantageous Effects

In the present disclosure, there is provided very excellent effects that damages to the metal sheath at the time of collision with foreign objects such as small stones is suppressed to be small, facilitation of replacing work of the metal sheath is realized, and in addition, attachment of the metal sheath to the leading edge section can be performed easily with high precision.

MODE FOR CARRYING OUT THE DISCLOSURE

Hereinafter, the present disclosure will be described based on the drawings.

FIGS. 1 to 5A show one embodiment of a composite vane according to the present disclosure, and in the embodiment, a case where the composite vane according to the present disclosure is a guide vane as a stator vane composing a turbofan engine will be described by being cited as an example.

Figure 1:
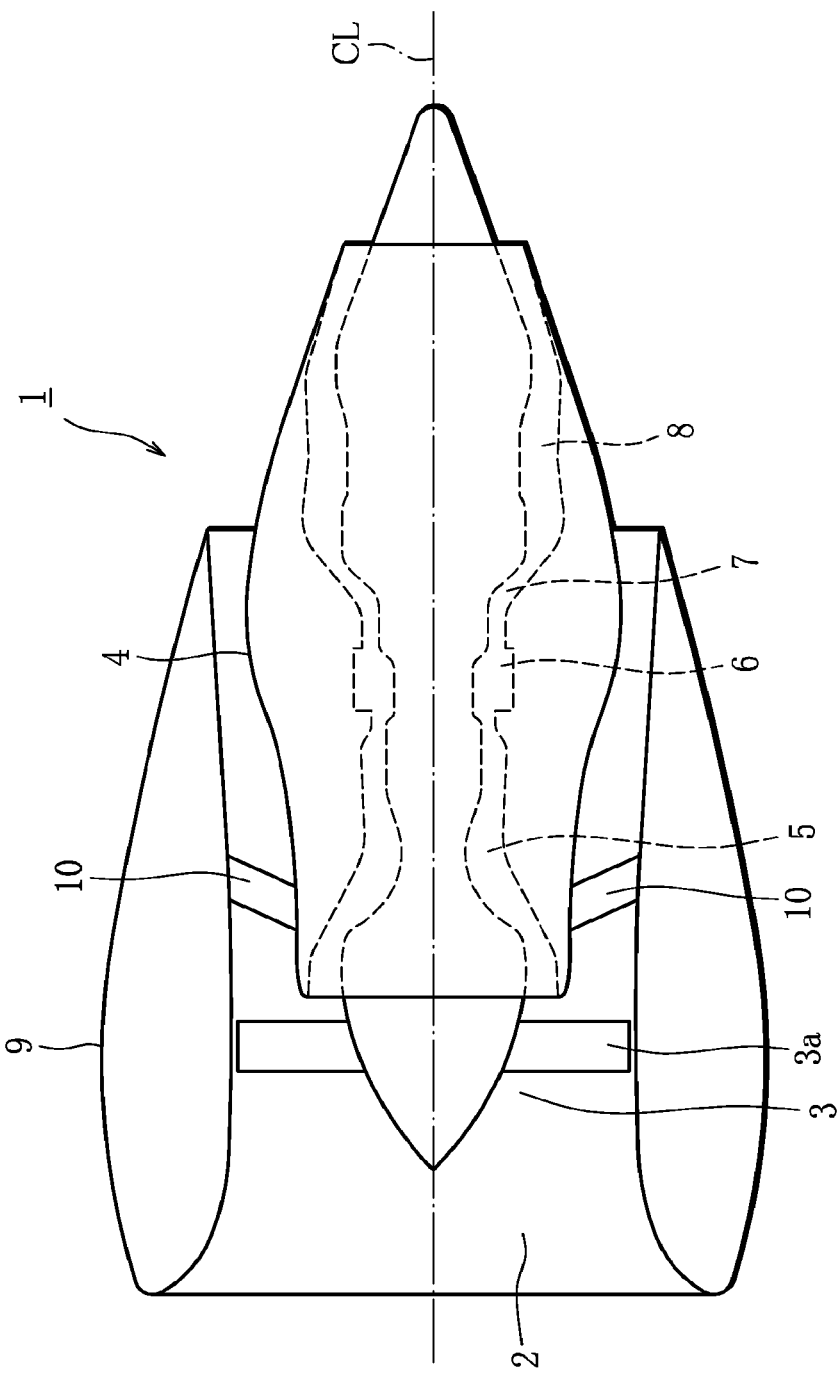
FIG. 1 is a schematic sectional explanatory view of a turbofan engine that adopts a composite vane according to one embodiment of the present disclosure as a guide vane.

As shown in FIG. 1, a turbofan engine 1 is formed to feed air that is taken in from an air intake 2 at a front part (a left part in the drawing) to a compressor 5 in an engine internal cylinder 4 with a fan 3 having a plurality of fan blades 3a, to inject fuel into the air which is compressed by the compressor 5 to cause the fuel to combust in a combustion chamber 6, and to rotate a high-pressure turbine 7 and a low-pressure turbine 8 about an axis CL by expansion of high-temperature gas that is generated by the combustion.

In the turbofan engine 1, it is formed that guide vanes 10 as a plurality of stator vanes are placed in a bypass channel between an inner periphery of a nacelle 9 that covers the plurality of fan blades 3a of the fan 3 and an outer periphery of the engine internal cylinder 4, and these guide vanes 10 are placed equidistantly around the engine internal cylinder 4 so as to straighten a swirling air flow that flows through the bypass channel.

Figure 2:
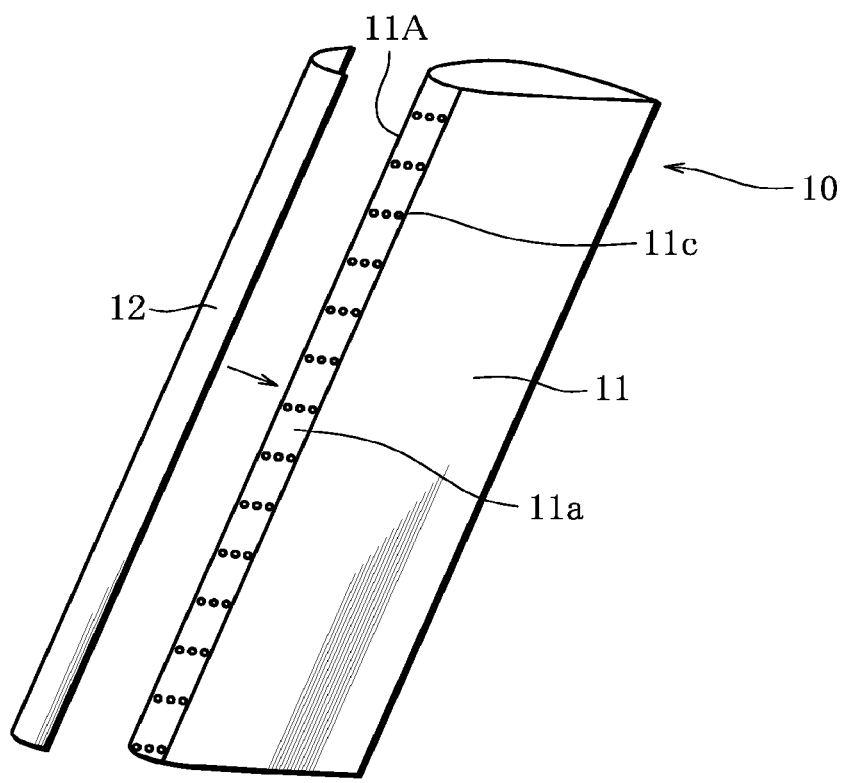
FIG. 2 is an exploded perspective explanatory view of the guide vane in FIG. 1.

As shown in FIG. 2, the guide vane 10 comprises a composite vane body 11 formed of a composite material, and a metal sheath 12 that covers a leading edge section (a leading edge and a vicinity of the leading edge) 11A of the composite vane body 11.

The composite vane body 11 is formed by being laminated in a vane thickness direction or three-dimensionally woven, for example, with a composite material of a thermosetting resin such as epoxy resin, phenol resin, or polyimide resin, or a thermoplastic resin such as polyether imide, polyether ether ketone, or polyphenylene sulfide, and reinforced fibers such as carbon fibers, aramid fibers or glass fibers.

Meanwhile, the metal sheath 12 is formed of a thin sheet made of a titanium alloy with a thickness of approximately 0.2 mm.

Figure 3:
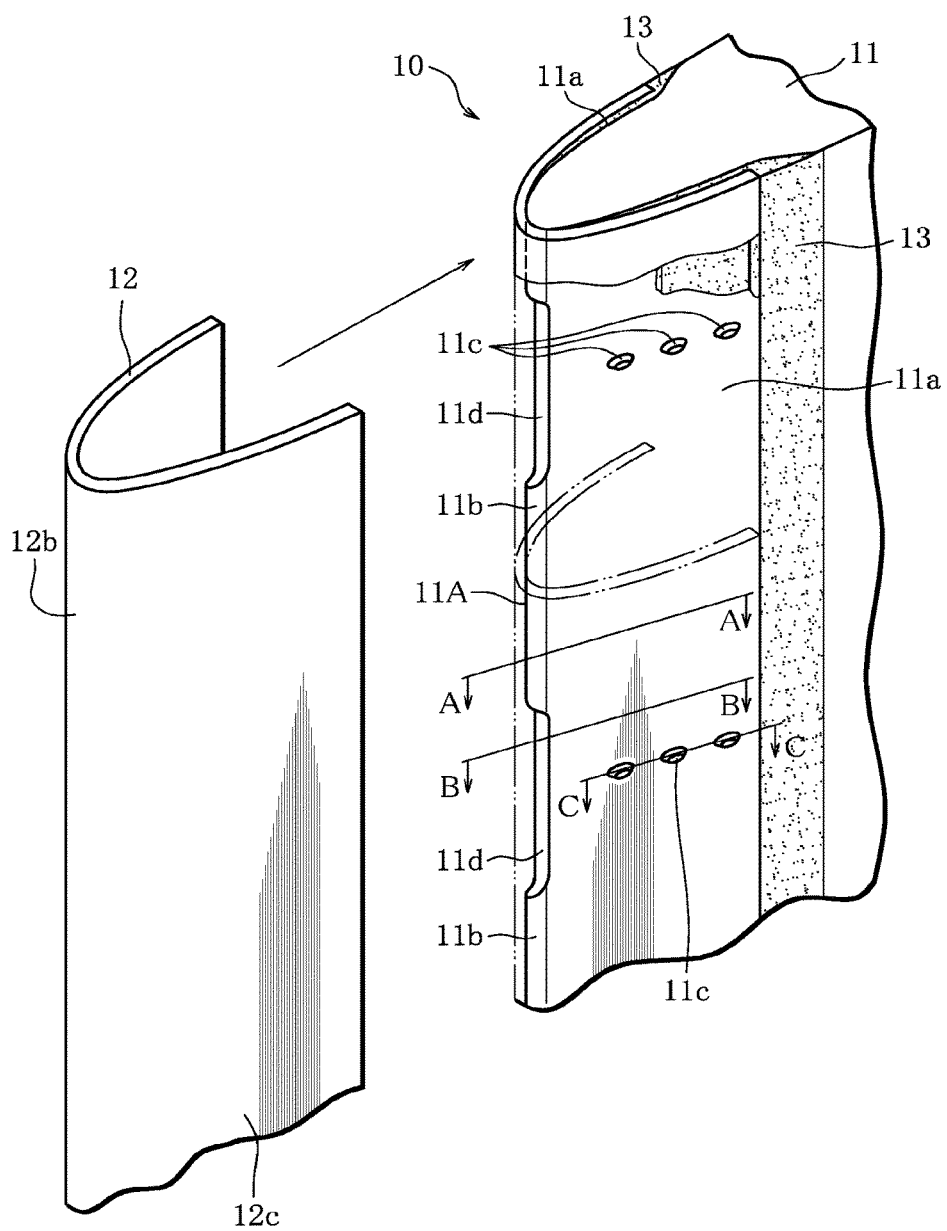
FIG. 3 is an enlarged perspective explanatory view in an end portion of the guide vane in FIG. 2.

In the leading edge section 11A of the composite vane body 11, an adhesive filling section 11a in which the soft adhesive 13 is filled is formed as is also shown in FIG. 3, and the metal sheath 12 is bonded to the leading edge section 11A of the composite vane body 11 by the soft adhesive 13.

Figure 4A:
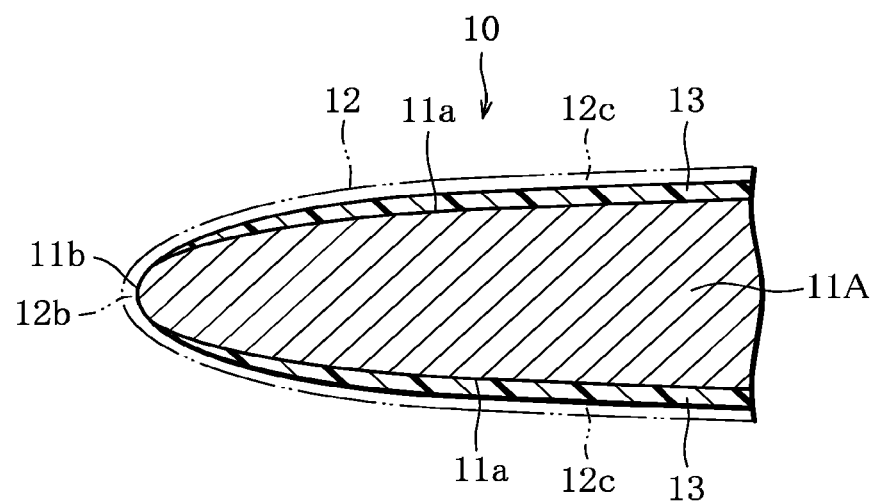
FIG. 4A is a partial sectional explanatory view at a position along a line A-A in FIG. 3.
Figure 4B:
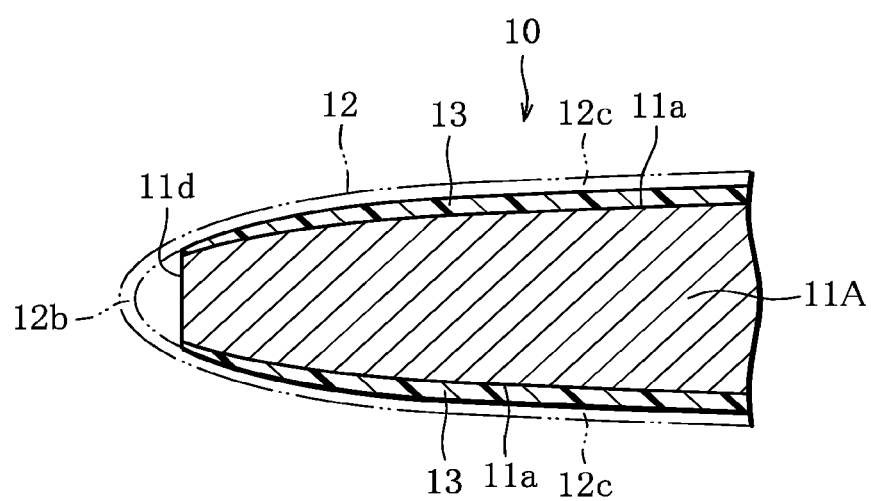
FIG. 4B is a partial sectional explanatory view at a position along a line B-B in FIG. 3.
Figure 5A:
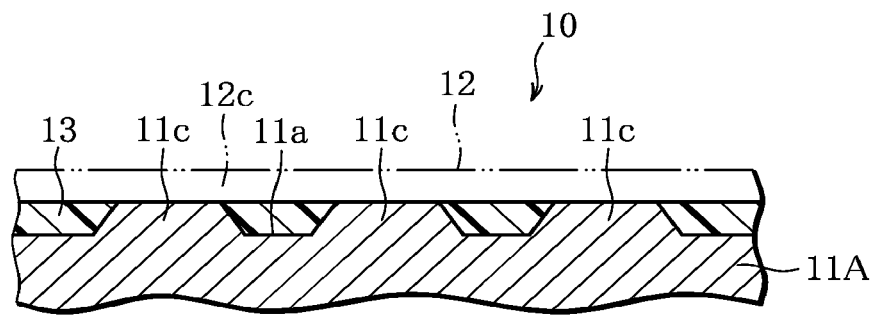
FIG. 5A is a partial sectional explanatory view of a vane surface side contact section at a position along a line C-C in FIG. 3.

In this case, as is also shown in FIG. 4A, FIG. 4B and FIG. 5A, in the leading edge section 11A of the composite vane body 11, a leading edge side contact section 11b that comes into contact with a curved section 12b corresponding to a leading edge of the metal sheath 12, and a plurality of protrusions 11c as vane surface side contact sections that come into contact with a planar section 12c corresponding to a vane surface of the metal sheath 12 are formed integrally with the adhesive filling section 11a.

Each of the plurality of protrusions 11c has at least a same height as a thickness (approximately 0.2 mm) of a layer of a requisite amount of the soft adhesive 13 which is filled in the adhesive filling section 11a, and therefore the leading edge side contact section 11b and the plurality of protrusions 11c function as positioners to the leading edge section 11A of the composite vane body 11.

The leading edge side contact sections 11b are placed at a plurality of positions in a vane width direction (a vertical direction in FIG. 3), and a space between the leading edge side contact sections 11b and 11b which are adjacent to each other is formed as an adhesive sump 11d which composes a part of the adhesive filling section 11a. A distance between the leading edge side contact sections 11b and 11b which are adjacent with the adhesive sump 11d therebetween is set at 50 to 100 mm.

Meanwhile, each of the plurality of protrusions 11c as the vane surface side contact sections forms a truncated cone shape with a diameter of approximately 5 mm, and at each of a plurality of positions (FIG. 3 shows only two positions) in the vane width direction, three protrusions 11c are placed in a straight line in a vane chord direction (a diagonally lateral direction in FIG. 3) in the embodiment, and a distance in the vane width direction between rows of the plurality of protrusions 11c is set at 10 to 50 mm.

In the guide vane 10, a reduction rate of a bonded area to the metal sheath 12 by providing the plurality of leading edge side contact sections 11b and the plurality of protrusions 11c is controlled within 5% of a total area of the adhesive filling section 11a.

In the guide vane 10 according to the embodiment, in a production process thereof, in a case of bonding the metal sheath 12 to the leading edge section 11A of the composite vane body 11 via the soft adhesive 13, after at least a requisite amount of the soft adhesive 13 is filled in the adhesive filling section 11a of the leading edge section 11A, and the soft adhesive 13 is applied on a bond surface of the metal sheath 12, the metal sheath 12 is fitted onto the leading edge section 11A of the composite vane body 11 and is pressed against the plurality of leading edge side contact sections 11b and the plurality of protrusions 11c.

At this time, the plurality of leading edge side contact sections 11b come into contact with the curved section 12b of the metal sheath 12, and the plurality of protrusions 11c come into contact with the planar section 12c of the metal sheath 12 with at least the same height as the thickness of the layer of a requisite amount of the soft adhesive 13 which is filled in the adhesive filling section 11a, that is, the metal sheath 12 contacts the layer of the soft adhesive 13 uniformly in a state where positioning is performed. Therefore, attachment of the metal sheath 12 to the leading edge section 11A is performed easily with high precision.

By the soft adhesive 13 which is squeezed out by pressing the metal sheath 12 against the composite vane body 11, the composite vane body 11 and the metal sheath 12 which is attached with high precision are connected to be flush with each other, and a vane sectional shape is ensured.

In the guide vane 10 according to the embodiment, the leading edge side contact sections 11b are placed at the plurality of positions in the vane width direction, and the space between the adjacent leading edge side contact sections 11b and 11b is formed as the adhesive sump 11b which composes a part of the adhesive filling section 11a. Therefore, the curved section 12b of the metal sheath 12 is bonded to the leading edge section 11A of the composite vane body 11 more firmly.

Further, since in the guide vane 10 according to the embodiment, the adhesive filling section 11a, the leading edge side contact sections 11b and the plurality of protrusions 11c are formed integrally in the leading edge section 11A of the composite vane body 11, the leading edge side contact sections 11b and the plurality of protrusions 11c do not have to be provided separately, and the production cost is reduced correspondingly.

Figure 5B:
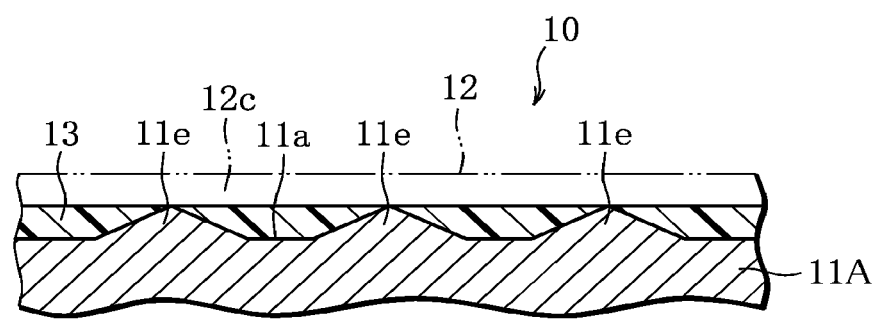
FIG. 5B is a partial sectional explanatory view at a position corresponding to the line C-C in FIG. 3 showing another configuration example of the vane surface side contact section.
Figure 5C:
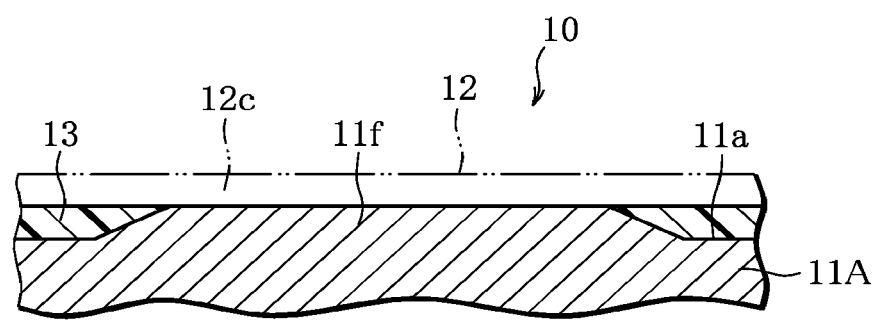
FIG. 5C is a partial sectional explanatory view at a position corresponding to the line C-C in FIG. 3 showing still another configuration example of the vane surface side contact section.

In the above described embodiment, the case where the vane surface side contact sections are protrusions 11c each forming the truncated cone shape is shown, but the vane surface side contact sections are not limited thereto, and as shown in FIG. 5B, the vane surface side contact sections may be protrusions 11e each forming a triangle in section, or the vane surface side contact section may be a protrusion 11f forming a trapezoidal shape in section as shown in FIG. 5C.

Further, in the above described embodiment, three of the protrusions 11c (the vane surface side contact sections) each forming the truncated cone shape with a diameter of approximately 5 mm are placed side by side in the straight line shape in the vane chord direction at each of the plurality of positions in the vane width direction, but the present disclosure is not limited thereto, and as another constitution, the plurality of protrusions 11c may be placed in a zigzag fashion over the vane width direction, for example.

Further, in the above described embodiment, the case where the composite vane according to the present disclosure is the guide vane 10 as the stator vane that constitutes the turbofan engine 1 is described, but the present disclosure is not limited thereto, and the present disclosure can be also adopted in a rotor blade and a tail rotor blade of a rotorcraft, besides being able to be adopted in the fan blade of a turbofan engine, for example.

The constitution of the composite vane according to the present disclosure is not limited to the above described embodiment.

A first aspect of the present disclosure is a composite vane including a composite vane body formed of a composite material of a thermosetting resin or a thermoplastic resin, and reinforced fibers, and a metal sheath that is bonded to a leading edge section (a leading edge and a vicinity of the leading edge) of the composite vane body via a soft adhesive to cover the leading edge section, wherein an adhesive filling section in which the soft adhesive is filled, a leading edge side contact section that comes into contact with a curved section corresponding to a leading edge of the metal sheath, and a plurality of vane surface side contact sections that come into contact with a planar section corresponding to a vane surface of the metal sheath, with at least a same height as a thickness of a layer of a requisite amount of the soft adhesive filled in the adhesive filling section are formed in the leading edge section of the composite vane body.

In a production process of the composite vane according to the present disclosure, in a case where the metal sheath is bonded to the leading edge section of the composite vane body via the soft adhesive, after a requisite amount of the soft adhesive is filled in the adhesive filling section of the leading edge section, and the soft adhesive is applied to a bond surface of the metal sheath, the metal sheath is fitted onto and pressed against the leading edge section of the composite vane body, whereby the leading edge side contact section comes into contact with the curved section of the metal sheath, and the plurality of vane surface side contact sections come into contact with the planar section of the metal sheath with at least the same height as the thickness of the layer of the requisite amount of the soft adhesive which is filled in the adhesive filling section. That is, the metal sheath comes into contact with the layer of the soft adhesive uniformly in the state where positioning is performed, and therefore, attachment of the metal sheath to the leading edge section is performed easily with high precision.

The first aspect of the present disclosure brings about very excellent effects that damages to the metal sheath at the time of collision with foreign objects such as small stones is suppressed to be small, facilitation of replacement work of the metal sheath is realized, and in addition, attachment of the metal sheath to the leading edge section can be performed easily with high precision.

In a second aspect of the present disclosure, the leading edge side contact sections are placed in a plurality of positions in a vane width direction, and a space between the leading edge side contact sections adjacent to each other is formed as an adhesive sump that constitutes a part of the adhesive filling section.

According to the second aspect of the present disclosure, the curved section of the metal sheath can be bonded to the leading edge section of the composite vane body more firmly.

In a third aspect of the present disclosure, the adhesive filling section, the leading edge side contact sections and the vane surface side contact sections are formed integrally in the leading edge section of the composite vane body.

According to the third aspect of the present disclosure, the leading edge side contact sections and the vane surface side contact sections do not have to be provided separately, and production cost is reduced correspondingly.

In the composite vane according to the present disclosure, for the thermosetting resin for composing the composite vane body, epoxy resin, phenol resin and polyimide resin can be used, for example, and for the thermoplastic resin that composes the composite vane body, polyether imide, polyether ether ketone, and polyphenylene sulfide can be used, for example. For the reinforced fibers that compose the composite vane body, carbon fibers, aramid fibers and glass fibers can be used, for example, and the composite vane body is formed of the composite material composed of these materials being laminated in the vane thickness direction, or being three-dimensionally woven, for example.

Meanwhile, for the metal sheath which is bonded to the leading edge section of the composite vane body, a titanium alloy can be used.

Further, in the composite vane according to the present disclosure, as the soft adhesive, an adhesive having such a property that adhesive strength does not reduce between the materials having different coefficients of thermal expansion, such as a soft polyvinyl chloride adhesive and polyethylene terephthalate adhesive can be used, and a so-called elastic adhesive having the property of a rubber such as polyurethane and silicone can be also adopted.

Further, in the composite vane according to the present disclosure, as the vane surface side contact section that comes into contact with the planar section corresponding to the vane surface of the metal sheath, a protrusion forming a semispherical shape with a diameter of approximately 5 mm, a protrusion forming a triangle in section with approximately the same size as this, a protrusion forming a truncated cone shape can be adopted, and the vane surface side contact section is not limited to any one of them.

Here, when the leading edge side contact sections are placed in a plurality of positions in the vane width direction, the distance between the leading edge side contact sections which are adjacent to each other with the adhesive sump therebetween is desirably set at 50 to 100 mm.

Meanwhile, when the plurality of vane surface side contact sections are protrusions forming semispherical shapes, for example, a plurality of protrusions can be placed side by side in a straight line shape in the vane chord direction in each of a plurality of positions in the vane width direction, or a plurality of protrusions can be placed in a zigzag fashion over the vane width direction, and when a plurality of protrusions are placed side by side in the vane chord direction in each of a plurality of positions in the vane width direction, the distance in the vane width direction between the rows of the protrusions is desirably set at 10 to 50 mm.

In the composite vane according to the present disclosure, the reduction rate of the bond area to the metal sheath by providing the leading edge side contact sections and the plurality of vane surface side contact sections is desirably controlled within 5% of the total area of the adhesive filling section.

Explanation of Reference Signs

10 Guide vane (composite vane)
11 Composite vane body
11A Leading edge section
11a Adhesive filling section
11b Leading edge side contact section
11c, 11e, 11f Protrusion (vane surface side contact section)
11d Adhesive sump (adhesive filling section)
12 Metal sheath
12b Curved section
12c Planar section
13 Soft adhesive

The invention claimed is:

1. A composite vane comprising:
a composite vane body formed of a composite material of a thermosetting resin or a thermoplastic resin, and reinforced fibers; and
a metal sheath formed of a thin sheet made of a titanium alloy that is bonded to a leading edge section of the composite vane body via a soft adhesive to cover the leading edge section,
wherein an adhesive filling section in which the soft adhesive is filled, leading edge side contact sections that come into contact with a curved section corresponding to a leading edge of the metal sheath, and a plurality of protrusions that come into contact with a planar section corresponding to a vane surface of the metal sheath and have at least a same height as a thickness of a layer of a requisite amount of the soft adhesive filled in the adhesive filling section are formed in the leading edge section of the composite vane body.

2. The composite vane according to claim 1,
wherein the leading edge side contact sections are placed in a plurality of positions in a vane spanwise direction, and a space between the leading edge side contact sections adjacent to each other is formed as an adhesive sump that constitutes a part of the adhesive filling section.

3. The composite vane according to claim 1,
wherein the adhesive filling section, the leading edge side contact sections and the protrusions are formed integrally in the leading edge section of the composite vane body.

4. The composite vane according to claim 2,
wherein the adhesive filling section, the leading edge side contact sections and the protrusions are formed integrally in the leading edge section of the composite vane body.

5. The composite vane according to claim 1,
wherein each of the protrusions presents a truncated cone shape in section.

6. The composite vane according to claim 1,
wherein each of the protrusions presents a triangle shape in section.

7. The composite vane according to claim 1,
wherein each of the protrusions presents a trapezoidal shape in section.

8. The composite vane according to claim 1,
wherein the leading edge side contact sections and the plurality of protrusions are within 5% of a total area of the adhesive filling section.

* * * * *